May 20, 1958 P. J. CARP 2,835,145
TRANSMISSION
Filed May 20, 1953
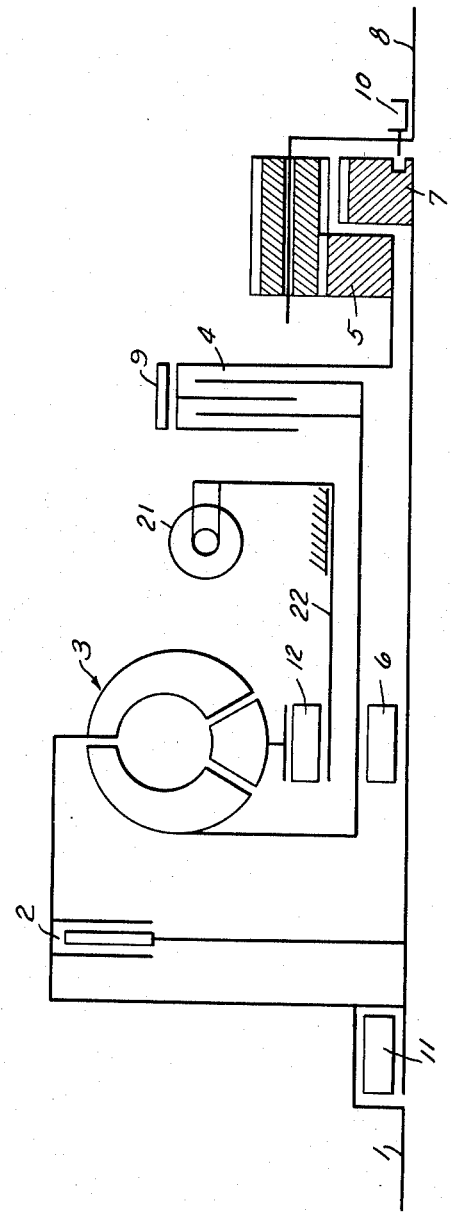

United States Patent Office 2,835,145
Patented May 20, 1958

2,835,145

TRANSMISSION

Peter J. Carp, Toronto, Ontario, Canada

Application May 20, 1953, Serial No. 356,241

5 Claims. (Cl. 74—688)

*Dual-driveline powershifting transmission*

*Governing device for transmissions*

The first invention deals with a speed-and-torque-ratio changing transmission, mainly for road and rail vehicles with internal combustion piston engines, embodying an hydrokinetic torque-converter and a planetary gear system, and having a higher efficiency than similar known devices.

The second invention deals with a governing device for such transmissions which, however, is not limited only to the transmission, object of the first invention.

The figure illustrates one example of the invention. The driveshaft 1 drives simultaneously the clutch 2 and the torque-converter 3; the turbine of this converter drives through the clutch 4 the front sun-gear of a compound cyclic gear-set, and, at the same time, through the one-way clutch 6, the rear sun-gear 7; the output shaft 8 is driven by the planetary carrier.

The transmission of this example provides four shift-combinations: the first, for starting and hard pulling, drives the rear sun-gear 7 through the converter 3; the clutches 2 and 4 are disengaged, and the reaction brake 9 locks the front sun-gear 5; all the drive going through the converter, this combination represents an hydraulic drive-line. The second combination provides a mechanical drive-line, in low-gear; the clutch 2 will be energized and thus takes the drive away from the converter 3 due to the one-way clutch 6, all the other clutches and reaction brakes remaining in the same condition as in the first combination. The third combination provides again an hydraulic drive-line but this time in high gear; reaction brake 9 and lock-up clutch 2 will be de-energized, and clutch 4 energized; both sun-gears 5 and 7 are driven, so that the planetary gear-set is locked up and we are in high gear. The fourth combination provides a dual-driveline, or a combination, in parallel, of one hydraulic and one mechanical driveline; clutch 2 is energized through shaft 22 and valve 21, when the converter operates as a coupling, and, since the turbine of the converter runs at lower speed than the input shaft 1, the drive to the rear sun-gear 7 is taken over by clutch 2, the front sun-gear 5 being still driven by the turbine of the converter 3.

This example defines clearly the main characteristic of the first invention as a combination, within a power-shifting transmission, of hydraulic, mechancial, and combined hydraulic-mechanical or dual drive-lines. The higher efficiency of this combination becomes apparent when it is realized that the elasticity of the dual-drive-line permits the use of lower drive-axle ratios, than in the case of a direct drive combination with the converter locked up, since the gain in engine efficiency by far outcancels the small losses in the hydraulic drive-line, which, in this combination carries less than half of the load (depending on the gear-ratio), and thus, due to hydraulic characteristics of the converter, reduces losses by an even larger amount than corresponding to the load reduction. A further contribution to high efficiency is the second combination of a mechanical drive-line in low-gear, with no hydraulic losses in the converter.

Another characteristic of this first invention provides a direct mechanical connection between the output-shaft 8 and the input-shaft 1; hand-operated dog-clutch 10, which also can be a friction clutch, connects drive-shaft 8 through the one-way clutch 11 to the input shaft 1. This characteristic not only allows push-starts at much lower speeds and higher efficiency than with known similar transmissions, but it contributes to higher efficiency of the transmission in allowing to dispense with the rear oil pump (in case of an hydrostatically governed transmission), provided the front oil-pump is of the variable volume type. The one-way clutch 11 also provides full engine braking in low-gear, regardless of the governing device employed.

In the case of heavy road, off-the-road, and rail-vehicles, this invention provides a third characteristic in locking, mechanically, the turbine of the converter to the shaft driving the rear sun-gear 7 by any known device, supplementing the one-way clutch 6, so that the shift sequence will provide, for each gear combination of a gear system behind the compound cyclic gear-set shown in the figure, first an hydraulic drive-line, second a dual-driveline and third a mechanical driveline. The benefit for heavy vehicles of such a scheme is readily apparent, since the shift from one gear-ratio to another will be smoothened, and the work performed by friction clutches and reaction brakes considerably diminished. Furthermore, direct mechanical drive-lines can be provided for most of the gear-ratios.

I claim:

1. A transmission comprising a power input shaft, a hydrokinetic torque converter-coupling including impeller, turbine and reaction members, an output shaft, a planetary gear system located between said converter and said output shaft providing a plurality of gear ratios, said planetary gear system having at least two inner sun gears, a clutch selectivity coupling one of said inner sun gears to said input shaft, clutch means for selectively coupling the second of said inner sun gears to said turbine, a one-way clutch for coupling said turbine to said first inner sun gear, reaction lock means for locking said second inner sun gear against rotation when said clutch means is disengaged, planetary gears engaging said first and second inner sun gears, an element of said planetary gear system connected to said output shaft, said element being driven by said planetary gears.

2. A transmission according to claim 1, said one inner sun gear coupled to said input shaft, and said second inner sun gear coupled to said turbine constituting a high gear in split drive, said high gear operating also selectively through the converter only, when said clutch is disengaged.

3. A transmission according to claim 2, said clutch together with said one inner sun gear constituting one mechanical low gear when said second sun gear is locked by said reaction lock means, said low gear operating also selectively through the converter only, when said clutch is disengaged.

4. In combination a transmission according to claim 2, a valve operated under the influence of said reaction member when said torque converter operates as coupling, said valve controlling means for energizing said clutch which, when engaged constitutes the mechanical drive-line of said split-drive, means for disengaging said clutch.

5. In combination, a transmission according to claim 1 and means for coupling said output shaft to said input shaft.

References Cited in the file of this patent

UNITED STATES PATENTS

| | | |
|---|---|---|
| 2,277,214 | Dodge | Mar. 24, 1942 |
| 2,290,319 | Dodge | July 21, 1942 |
| 2,301,451 | Pollard | Nov. 10, 1942 |
| 2,302,714 | Pollard | Nov. 24, 1942 |
| 2,606,460 | Kelley | Aug. 12, 1952 |
| 2,625,057 | Kelbel | Jan. 13, 1953 |